(12) United States Patent
Duong et al.

(10) Patent No.: US 10,977,338 B1
(45) Date of Patent: Apr. 13, 2021

(54) REDUCED-AREA CIRCUIT FOR DOT PRODUCT COMPUTATION

(71) Applicant: Perceive Corporation, San Jose, CA (US)

(72) Inventors: Kenneth Duong, San Jose, CA (US); Jung Ko, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 178 days.

(21) Appl. No.: 16/120,386

(22) Filed: Sep. 3, 2018

Related U.S. Application Data

(60) Provisional application No. 62/724,589, filed on Aug. 29, 2018, provisional application No. 62/660,914, filed on Apr. 20, 2018.

(51) Int. Cl.
| | |
|---|---|
| *G06F 17/16* | (2006.01) |
| *G06T 1/20* | (2006.01) |
| *G06N 3/08* | (2006.01) |
| *G06N 3/063* | (2006.01) |
| *G06N 3/04* | (2006.01) |
| *G06K 9/00* | (2006.01) |

(52) U.S. Cl.
CPC ............... *G06F 17/16* (2013.01); *G06N 3/04* (2013.01); *G06N 3/063* (2013.01); *G06N 3/08* (2013.01); *G06T 1/20* (2013.01); *G06K 9/00288* (2013.01); *G06T 2207/20081* (2013.01); *G06T 2207/20084* (2013.01); *G06T 2207/20224* (2013.01); *G06T 2207/30201* (2013.01)

(58) Field of Classification Search
None
See application file for complete search history.

(56) References Cited

U.S. PATENT DOCUMENTS

| 5,956,703 A | 9/1999 | Turner et al. |
|---|---|---|
| 10,740,434 B1 | 8/2020 | Duong et al. |

(Continued)

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

(Continued)

*Primary Examiner* — Michael D. Yaary
(74) *Attorney, Agent, or Firm* — Adeli LLP

(57) ABSTRACT

Some embodiments provide a method for executing a portion of a node of a machine-trained network. The method receives (i) multiple input values computed by previous nodes of the machine-trained network and (ii) for each of the input values, a corresponding predefined weight value. Each of the weight values is zero, a positive value, or a negation of the positive value. To compute a dot product of the input values with the weight values, the method passes to an adder circuit the input value for each input value with a corresponding positive weight value, the value zero for each input value with a corresponding weight value of zero, and a binary inversion of the input value for each input value with a corresponding negative weight value. After the adder circuit adds the values passed to it, the method adds an additional value based on the number of negative weight values.

19 Claims, 13 Drawing Sheets

(56) References Cited

U.S. PATENT DOCUMENTS

| | | | |
|---|---|---|---|
| 2004/0078403 | A1 | 4/2004 | Scheuermann et al. |
| 2018/0018559 | A1* | 1/2018 | Yakopcic ............ G11C 13/004 |
| 2018/0114569 | A1 | 4/2018 | Strachan et al. |
| 2018/0246855 | A1 | 8/2018 | Redfern et al. |
| 2018/0293691 | A1 | 10/2018 | Nurvitadhi et al. |
| 2018/0307950 | A1* | 10/2018 | Nealis ..................... G06F 5/015 |
| 2018/0373975 | A1 | 12/2018 | Yu et al. |
| 2019/0114499 | A1 | 4/2019 | Delaye et al. |
| 2020/0134461 | A1 | 4/2020 | Chai et al. |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Courbariaux, Matthieu, et al., "Binarized Neural Networks: Training Neural Networks with Weights and Activations Constrained to +1 or -1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

Moshovos, Andreas, et al., "Exploiting Typical Values to Accelerate Deep Learning," Computer, May 24, 2018, 13 pages, vol. 51—Issue 5, IEEE Computer Society, Washington, DC.

Non-Published commonly Owned U.S. Appl. No. 16/120,387, filed Sep. 3, 2018, 47 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Sen, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

(56) References Cited

OTHER PUBLICATIONS

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (Micro '16), Oct. 15-19, 2016, 12 pages, IEEE, Taipei, Taiwan.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.
Non-published commonly-owned related U.S. Appl. No. 16/924,360, filed Jul. 9, 2020, 54 pages, Perceive Corporation.

* cited by examiner

REDUCED-AREA CIRCUIT FOR DOT PRODUCT COMPUTATION

BACKGROUND

In a typical neural network, a standard computation is a dot product between input values (activations) and weight values. A typical way for an integrated circuit to compute these weight values is to use a multiply-accumulate (MAC) circuit that repeatedly performs the multiplication of an input value by a weight value, adds that to the existing partial dot product, and stores the new partial dot product. However, this requires numerous clock cycles, as each term in the dot product uses a separate cycle. Accordingly, techniques for parallelization without massively expanding the surface area of the circuit are required.

BRIEF SUMMARY

Some embodiments provide an integrated circuit (IC) for implementing a machine-trained network (e.g., a neural network) that computes dot products of input values and corresponding weight values (among other operations). The IC of some embodiments includes a neural network computation fabric with numerous dot product computation circuits in order to process partial dot products in parallel (e.g., for computing the output of a node of the machine-trained network). In some embodiments, the weight values for each layer of the network are ternary values (e.g., each weight is either zero, a positive value, or the negation of the positive value), with at least a fixed percentage (e.g., 75%) of the weight values being zero. As such, some embodiments reduce the size of the dot product computation circuits by mapping each of a first number (e.g., 144) input values to a second number (e.g., 36) of dot product inputs, such that each dot product input only receives at most one input value with a non-zero corresponding weight value.

Specifically, in some embodiments, the dot product computation circuit includes at least two sets of wires for each input value, with each of the sets of wires for a given input value providing that input value to at least two different dot product inputs. With a guarantee of at least 75% weight sparsity (i.e., at least 75% of the weight values for any set of input values are zero), the number of dot product inputs is set at 25% (or slightly more than 25%, for redundancy) of the number of input values provided to the circuit. In some embodiments, the weight sparsity is guaranteed by the training algorithm used to train the weights to perform a specific purpose, and the IC is adaptable for any set of weights that meets the guarantee.

This weight sparsity and the wiring of input values to at least two of the dot product inputs ensures that, so long as the weights meet the sparsity requirement, at runtime it is possible to provide a maximum of one input value with a nonzero corresponding weight value to each of the dot product inputs for nearly any arrangement of the nonzero weight values. In some embodiments, each of the dot product inputs is a multiplexer, using the weight value index to specify which of its inputs to select. Specifically, in some embodiments for which 75% sparsity reduction is guaranteed, 8:1 multiplexers are used for the dot product inputs (8:1 rather than 4:1 because each input value is wired to two different multiplexers).

These wires are arranged, as mentioned, such that each multiplexer receives only one (or zero) input value with a nonzero corresponding weight. The weight values are not known at the time of IC manufacture, and thus the wiring design is resilient to any set of weight values (that meets the sparsity requirement). For redundancy, some embodiments use a number of dot product inputs (i.e., multiplexers) that is slightly more than 25% of the number of input values for the dot product computation (e.g., for 144 input values, using 40 rather than 36 inputs). This increases the ability to map the input values to the dot product inputs for any set of weights, at a small cost in terms of circuit area. In some such embodiments, a subset of the input values are wired to three of the dot product inputs rather than two. In some embodiments, a cuckoo hashing algorithm (or other such algorithm) is used to optimally map the wires to the various dot product inputs. This algorithm, in some embodiments, computes two hashes for each input value that map into two different dot product inputs, and wires each input value to these two dot product inputs. Other embodiments use other techniques to select the indices of the dot product inputs to which each input value is wired.

The weight values are known before the network is executed by the IC (i.e., at compile time), and thus the compiler can determine which of the two (or three) multiplexers that receive each input value with a non-zero corresponding weight at runtime will select that input value, such that each such input value is selected by exactly one multiplexer. In some embodiments, the compiler uses the same cuckoo hashing algorithm for this mapping as was used to determine the wiring. Specifically, the compiler of some embodiments assigns each input value to one of its wire sets (and thus to a dot product input (multiplexer)). For input values with a corresponding weight of zero, to which wire set the value is assigned does not matter. However, if a first input value with a nonzero corresponding weight is mapped to a dot product input that already has a second input value with a nonzero corresponding weight mapped to it, then the second input value is assigned to its second wire set. If this new mapping overlaps dot product inputs with a third input value with a nonzero corresponding weight, then the third input value is assigned to its other wire set, and so on.

The dot product computation is performed using an adder tree in some embodiments, with the multiplexers providing the inputs to a ternary multiply-accumulator (MAC) circuit, which provide the leaf inputs to the adder tree. As mentioned, the weight values for a particular dot product computation are all either zero, a positive value, or the negation of the positive value in some embodiments. In this case, the dot product does not require any multiplication, as the positive and negative weight values can be treated as 1 and −1, with a single multiplication by the positive value afterwards. Removing the multiplication at the leaves saves significant circuit area for a chip with numerous such computation circuits.

Thus, some embodiments use a ternary MAC circuit at the leaves of the dot product computation. This circuit determines how to combine two input values based on their corresponding weights. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The outputs of the ternary MACs provide the inputs to a standard adder tree that computes the dot product output (before multiplication by the positive weight value scaling factor).

In some embodiments, the ternary MAC (or other circuit used to incorporate the ternary weight values into the dot product) uses the two's complement technique to negate input values with a negative corresponding weight value. This technique inverts all of the bits of the input value and adds 1 to this inverted value. However, the use of this technique requires a half adder circuit for each ternary MAC, in order to add 1 to the inverted value. In order to save additional circuit space, some embodiments determine (at compile time) the number of negative weight values for each dot product computation and add this number to the dot product at the end of the computation. Thus, rather than a half adder circuit for each pair of input values, a single adder circuit is used after the adder tree to add this number to the dot product. The machine-trained networks of some embodiments also include a bias factor that is added to the dot product anyway, so this number can be added to the bias with minimal cost in terms of circuit surface area. For each input value, the resulting inputs to the adder tree effectively pass (i) the value zero if the corresponding weight value is zero, (ii) the input value if the corresponding weight value is positive, and (iii) the binary inversion of the input value if the corresponding weight value is negative.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide an integrated circuit (IC) for implementing a machine-trained network (e.g., a neural network) that computes dot products of input values and corresponding weight values (among other operations). The IC of some embodiments includes a neural network computation fabric with numerous dot product computation circuits in order to process partial dot products in parallel (e.g., for computing the output of a node of the machine-trained network). In some embodiments, the weight values for each layer of the network are ternary values (e.g., each weight is either zero, a positive value, or the negation of the positive value), with at least a fixed percentage (e.g., 75%) of the weight values being zero. As such, some embodiments reduce the size of the dot product computation circuits by mapping each of a first number (e.g., 144) input values to a second number (e.g., 36) of dot product inputs, such that each dot product input only receives at most one input value with a non-zero corresponding weight value.

Figure 1:
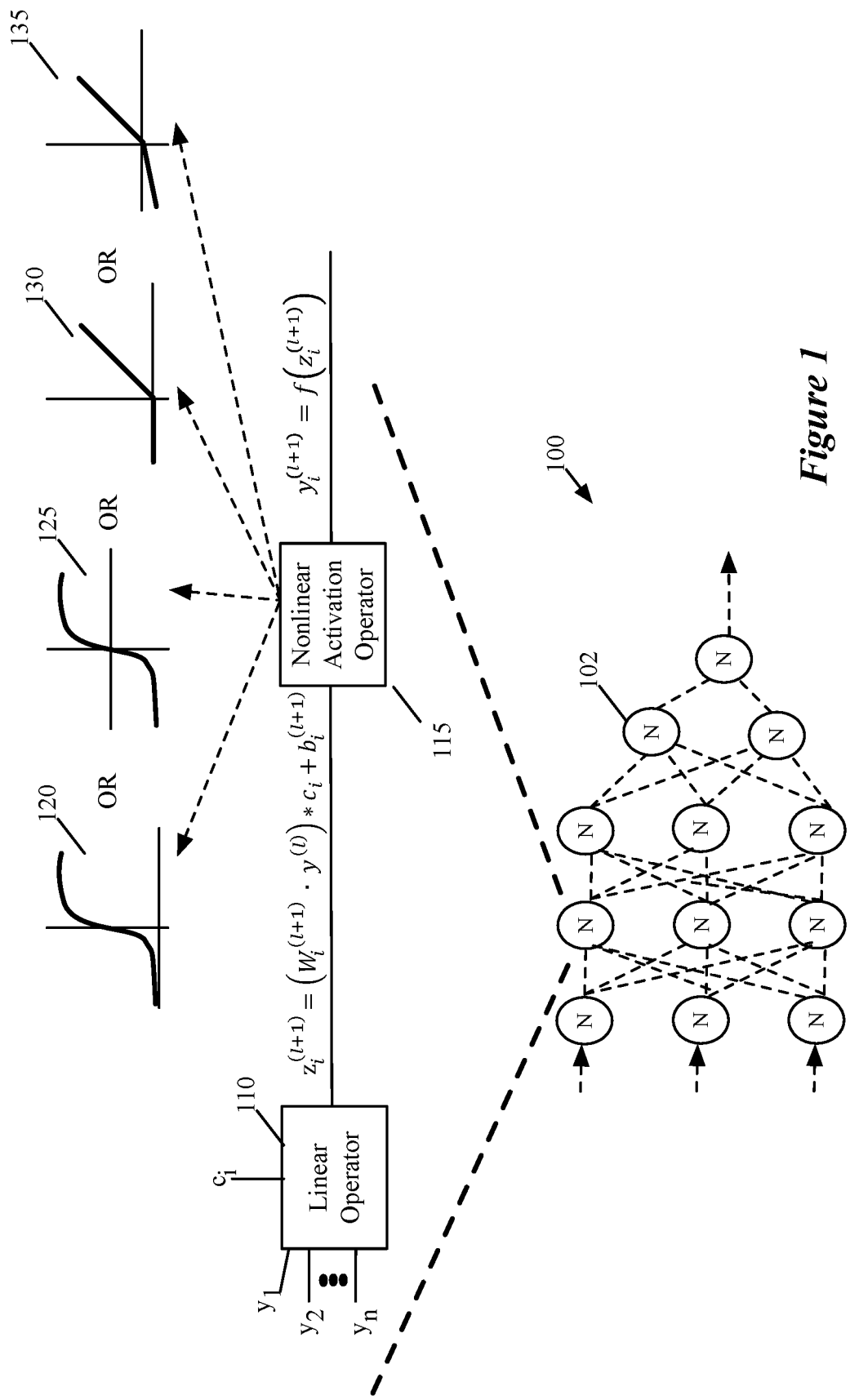
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value). In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, convolutional neural networks, etc.).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous stage node that the linear operator receives) plus an offset. Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_1$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}) \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

In some embodiments, the neural network is a convolutional feed-forward neural network. In this case, the intermediate layers (referred to as "hidden" layers) may include convolutional layers, pooling layers, fully-connected layers, and normalization layers. The convolutional layers of some embodiments use a small kernel (e.g., 3 pixels×3 pixels) to process each tile of pixels in an image with the same set of parameters. Pooling layers combine the outputs of clusters of nodes from one layer into a single node at the next layer, as part of the process of reducing an image (which may have a large number of pixels) or other input item down to a single output (e.g., a vector output).

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

As mentioned, some embodiments provide an IC that implements a machine-trained network such as that shown in FIG. 1. The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric.

The computation fabric of some embodiments provides a set of circuits (e.g., for dot product computation, activation function computation, etc.) for performing the various computations required for neural networks, with the network parameters (weight values, bias values, node arrangement, filter size, etc.) configurable. In some embodiments, the IC imposes certain requirements on the networks, such as a maximum size of the network, that the weight values be ternary (e.g., 0, α, and −α for each layer of the network), and/or that at least a particular percentage of the weight values be equal to zero.

Figure 2:
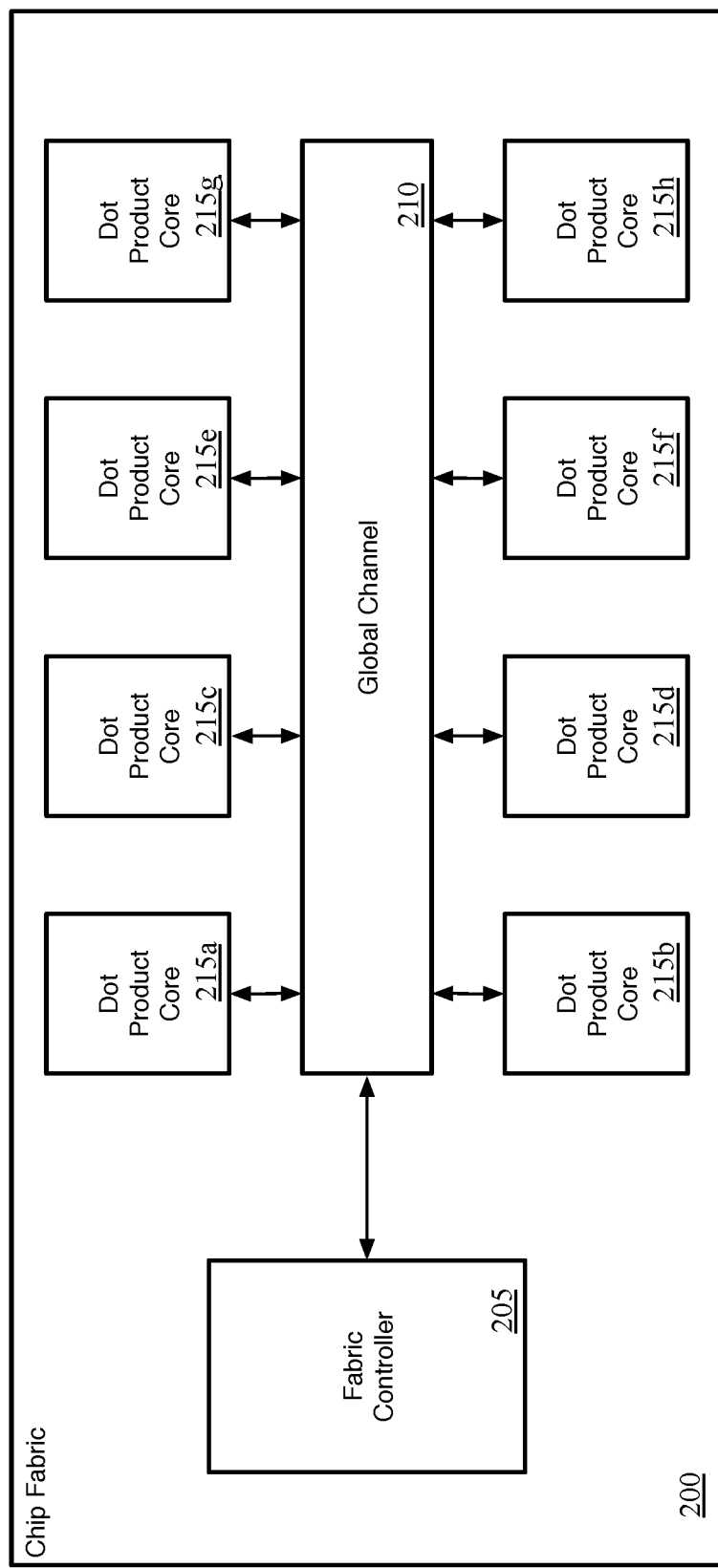
FIG. 2 conceptually illustrates the chip fabric of an integrated circuit of some embodiments FIG. 3 conceptually illustrates the data flow within one of the cores of the IC of some embodiments for a dot product computation.

FIG. 2 conceptually illustrates the neural network computation fabric 200 (also referred to as the chip fabric) of such an IC of some embodiments. The chip fabric 200 of some embodiments includes a fabric controller 205, a global channel (bus) 210, and a set of dot product cores 215*a-h*. The connections between the various components 205-215 represent the flow of both control data (e.g., configuration data for a particular neural network layer) and computation data at runtime in some embodiments.

The fabric controller 205 is responsible for managing the operation of the rest of the chip fabric 200 (e.g., the dot product cores 215) in some embodiments. The fabric controller 205 loads instruction arguments (e.g., weight values, previously computed activation values, etc.) from local memory (not shown) on the chip, maps instructions into a sequence of memory-mapped register writes, synchronizes the downstream controllers (e.g., controllers for the various cores 215, etc.). The instructions managed by the fabric controller 205 are configured at compile time, in some embodiments, based on the parameters of the network being implemented by the chip fabric 200. In some embodiments the fabric controller 205 interacts with a microprocessor of the IC as well.

The dot product cores 215*a-h* include circuitry for computing dot products (or partial dot products) in some embodiments, which is described in further details below. In some embodiments, this circuitry includes memory and/or buffers for storing weights and activations, controllers for reading these values out of memory, and adder trees for computing the partial dot products based on the weight and activation inputs. The adder trees and input circuitry of some embodiments are described below by reference to FIGS. 4 and 6. In some embodiments, though not shown in FIG. 2, the cores are grouped into clusters. For example, dot product cores 215*a-d* could be one cluster while dot product cores 215*e-h* are another cluster. In some such embodiments, each cluster or group of clusters (e.g., for a chip with more than two clusters) can run a separate network (so long as the networks do not require the entire set of cores on the chip). For instance, a single chip on an IOT device could run both a facial recognition network and an object recognition network.

The global channel 210 is responsible for providing a communications bus for control and computation data between the fabric controller 205 and the cores 215, as well as between the cores. The global channel 210, among other operations, accumulates partial dot products from multiple cores when computing dot products that require more computations than can be performed in a single core. In addition, the global channel 210 can move activations (i.e., dot product outputs) computed in one core 215 for storage (and for use as inputs in subsequent computations) in other cores 215. In some embodiments, the global channel 210 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 210.

Figure 3:
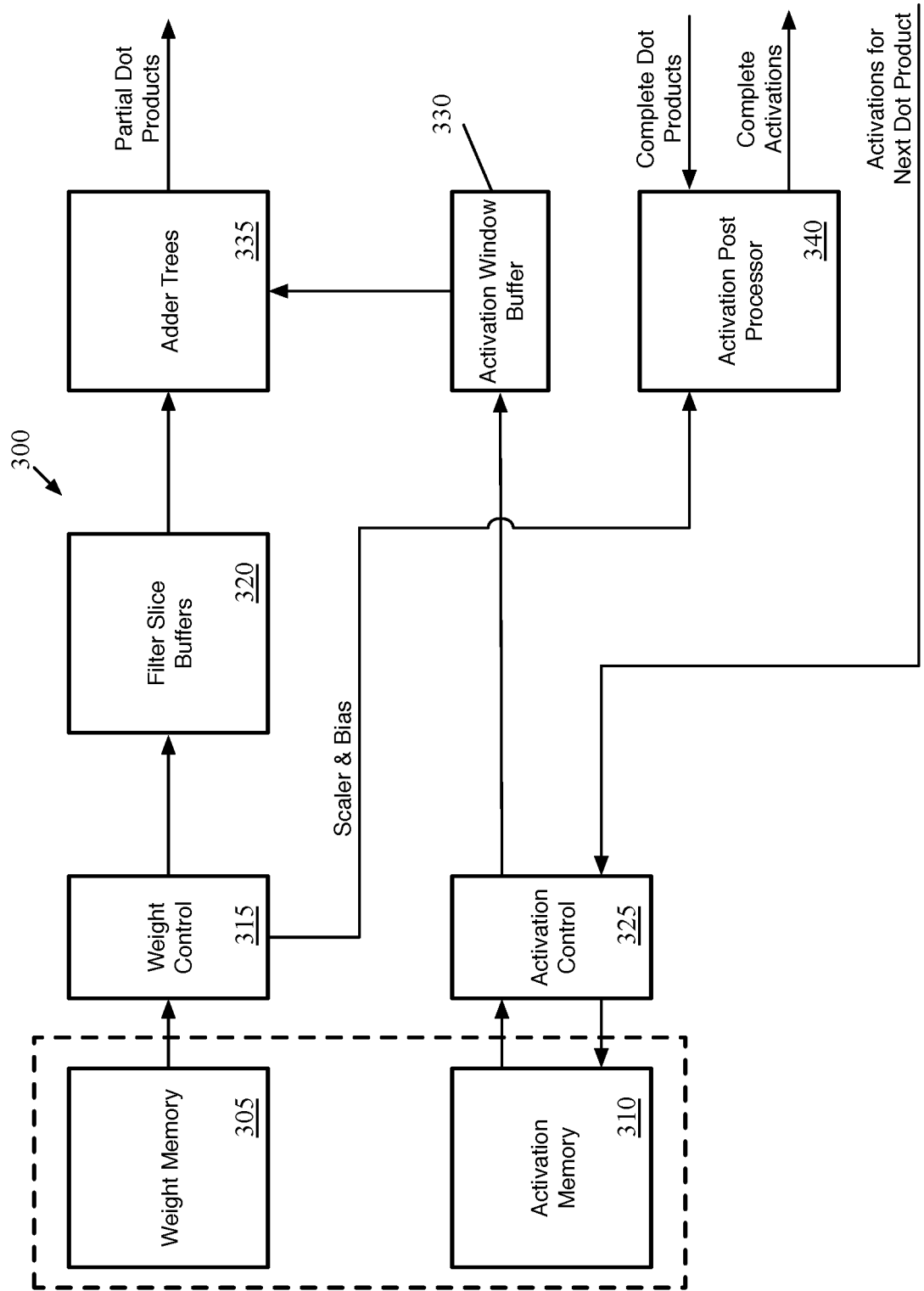

As mentioned, the dot product cores 215 are the primary computational circuits of the IC of some embodiments. FIG. 3 conceptually illustrates the data flow 300 within one of the cores of some embodiments for a dot product computation. This data flow will be described with certain specifics (e.g., weight sizes, number of separate adder trees, etc.) as examples, but it should be understood that different embodiments may use different sizes weight and/or activation values, different numbers of adder trees within a core, etc.

In some embodiments, the dot product cores store weight values (e.g., weights for multiple nodes in multiple layers) in the weight memory 305 and activation values in the activation memory 310. In some embodiments, as shown, these memories 305 and 310 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined at compile time (and do not change at runtime), while the activation values (the input values to a particular node being computed) are the output values from a previous computation (or, for the first layer, are otherwise based on the network input) and thus are determined at runtime. Thus, the weight memory 305 is typically larger than the activation memory 310 (e.g., 512 KB to 64 KB), as the activation memory is overwritten for each new computation while the weight memory 305 stores the weights for all of the dot product computations performed by the core. In some embodiments, the weights are stored as 1-bit or 2-bit values (e.g., zeros stored as a single bit and negative/positive values stored as 2-bit 1/−1), with a scale value for each layer also stored for later multiplication.

The weight controller 315 reads data from the weight memory 305 into a set of filter slice buffers 320 that store the weight values to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load 36 weight values into each filter slice buffer, which are actually used to compute 144 dot product components (with the requirement that at least 75% of the weight values be zero, the actual adder tree only receives 36 inputs for 144 activation values, as described in detail below). In some embodiments, each core includes numerous adder trees (e.g., 64) for simultaneously computing separate partial dot products and thus numerous filter slice buffers.

The activation controller 325 reads data (input values) from the activation memory 310 into the activation window buffer 330. In addition, the activation controller 325 arranges the input values within the activation window buffer 330 in some embodiments to match up with the weight values in the filters. In some embodiments, the input values in an activation window read into the buffer 330 include all of the values (as opposed to only 25% of the values), because the activation window is multiplied by numerous filters (i.e., some or all of the filters stored in the filter slice buffer). The input values, in some embodiments, are quantized to have a fixed size (e.g., 4 bits), for ease and simplicity of computation.

The adder trees 345 compute the dot products between the weight values in the filter slice buffers 320 and the input values in the activation window buffer 330. The details of the dot product computation circuits of some embodiments are described below by reference to FIGS. 4 and 6. These adder trees 345 output partial dot products (e.g., 10-bit values) and provide these values to the global channel, which combines the partial dot products with other partial dot products (from the same core and/or from other cores of the IC).

The global channel returns the completed dot products (there may be multiple dot products for different nodes of a layer of the machine-trained network) to the cores for post-processing by the activation post-processor 340. In some embodiments, different completed dot products are given to different cores, so a core that computes some of the partial dot products for a particular node may not perform the post-processing on the completed dot product for the particular node. The activation post-processor 340 performs various operations to finalize the node output. This circuit applies the bias constant (along with any additional value based on the number of negative weights, as described below by reference to FIG. 9) to the completed dot products, multiplies the dot product by any weight scaler value (i.e., if the weights for a layer are 0/α/−α, the circuit multiplies the dot product by a), and applies the activation (non-linear) function to the result. Some embodiments also quantize this result to a smaller (e.g., 4-bit) value by, e.g., truncating the output to only the most significant bits or clipping the result of the linear function (before applying the non-linear function. Other embodiments may use other techniques to quantize the result. In some embodiments, a configurable lookup table (LUT) is used the non-linear activation function, so that the chip is capable of using any type of non-linear activation function (as opposed to having a specific hardwired activation function).

The activation post-processor 340 outputs the completed activation values to the global channel (e.g., an activation write bus of this channel) that then provides the activation values to the appropriate cores for the next layer of the network. In some embodiments, while the dot products are being completed (i.e., after the adder trees 335 begin their computations), the activation controller 325 starts writing the next set of activation data (input values) into the activation window buffer 330, so that the filter slices loaded into the filter slice buffer can be applied to this next set of input values.

Though shown as part of the core in FIG. 3, in some embodiments the activation post-processors 340 are part of the global channel 110. Different embodiments may include one such post-processing circuit per core, one per cluster (e.g., sets of four cores), etc. These post-processor circuits receive completed dot products from the accumulating bus and provide the activation outputs (i.e., the inputs for the next layer of the neural network) to the non-computation bus to be provided to the appropriate core.

The partial dot product computations circuits (e.g., the adder trees 335), as mentioned, map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 4:
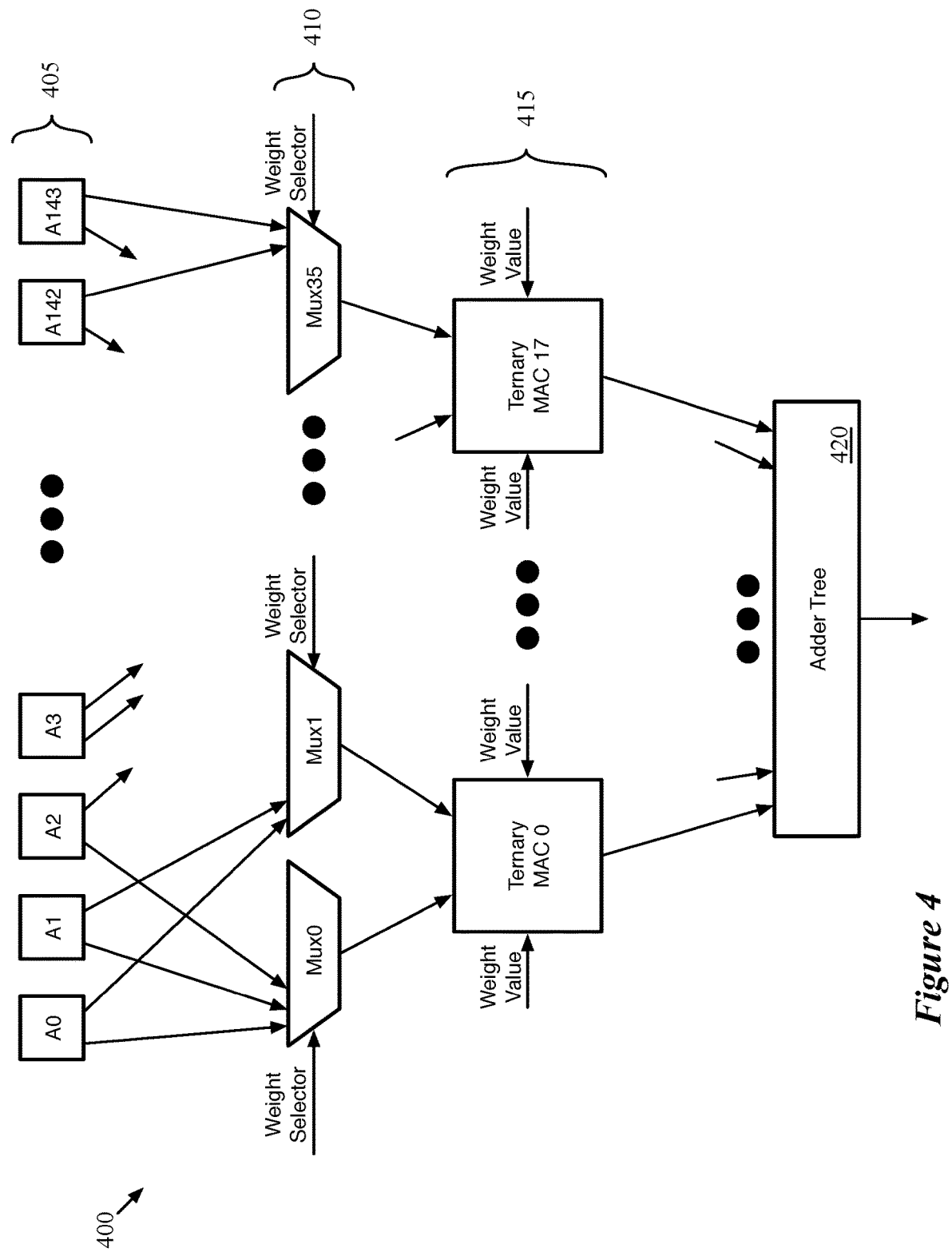
FIG. 4 illustrates an example of a partial dot product computation circuit for a guaranteed weight sparsity of at least 75%.

FIG. 4 illustrates an example of such a partial dot product computation circuit 400 for a guaranteed weight sparsity of at least 75%. The wiring of the input values for this dot product computation circuit ensures that, so long as the weights meet the sparsity requirement, at runtime it is possible to provide a maximum of one input value with a nonzero corresponding weight value to each of the dot product inputs for nearly any arrangement of the nonzero weight values. As shown, the dot product computation circuit 400 includes a set of activation inputs 405, a set of multiplexers 410, a set of ternary multiplier-accumulator (MAC) circuits 415, and an adder tree 420.

In this example, the dot product computation circuit 400 includes 144 input values 405. In different embodiments, the activation window may have different sizes, which defines the size of the partial dot product computation. Each input value storage (e.g., each buffer location) is connected to two of the thirty-six multiplexers 410. In this example, at least 75% sparsity is assumed for each set of weight values, and thus the 144 activation inputs can be reduced to 36 inputs to the actual dot product computation. This significantly reduces the circuit area required for the dot product computation, as the number of adders is reduced by 75% (the adder tree effectively starts with 36 values rather than 144 values).

The multiplexers 410 each have eight inputs and receive a set of select bits (the weight selector input) that specifies which of these eight inputs to pass to the dot product computation. Having thirty-six 8-input multiplexers 410 allows for 288 sets of wires from the activation inputs 405 to the multiplexers 410, which is two wires for each activation input. If the sparsity guarantee was only 50%, then seventy-two 4-input multiplexers could be used with two sets of wires for each activation input 405 (or seventy-two 8-input multiplexers with four sets of wires for each activation input 405), with similar proportions for different sparsity guarantees and numbers of wires per activation input.

The wire sets from the activation inputs to the multiplexers are arranged such that each multiplexer receives only one (or zero) input value with a nonzero corresponding weight. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 405 to the multiplexers 410. In some embodiments, this algorithm computes two hashes (e.g., with two different hash functions) for each of the activation input locations 405 that map to two different multiplexers 410 (e.g., by computing the hash modulo 36). Each activation input location 405 is wired to these two different multiplexers 410 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

Figure 5:
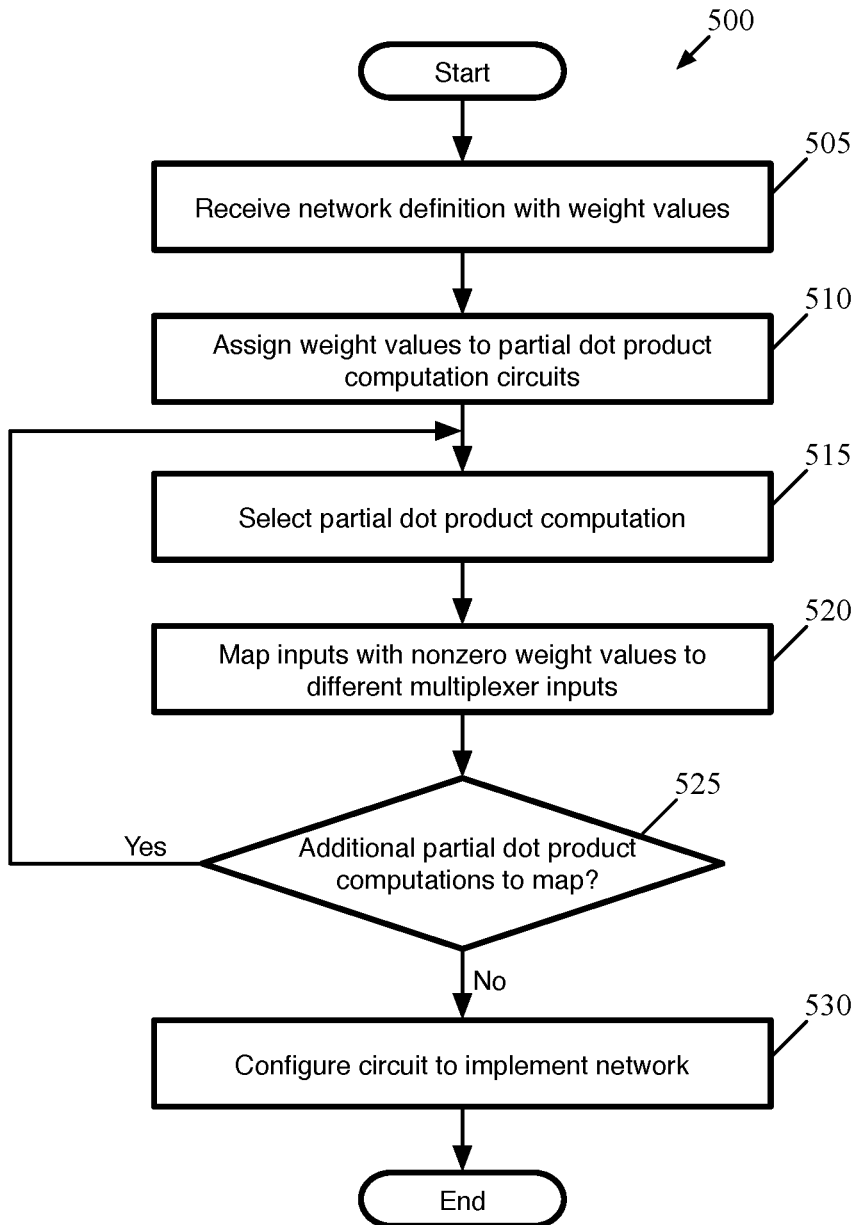
FIG. 5 conceptually illustrates a process of some embodiments for mapping input values to different multiplexer inputs.

The weight values are known before the network is executed by the IC (i.e., at compile time), and thus the compiler can determine which of the two multiplexers that receive each input value with a non-zero corresponding weight at runtime will select that input value, such that each input value is selected by only one multiplexer. FIG. 5 conceptually illustrates a process 500 of some embodiments for mapping input values to different multiplexer inputs. The process 500 is performed, in some embodiments, by a compiler that generates the configuration data to configure an IC to execute a specific network with predefined network parameters in order to perform a particular purpose (e.g., object recognition in images, face recognition, etc.).

As shown, the process 500 begins by receiving (at 505) a network definition that includes weight values for each node of the network. The network definition, in some embodiments, includes nodes and connections between nodes, the weight values and biases for the linear function of each of the nodes, the type of non-linear activation function(s) used, etc. In some embodiments, the weight values satisfy both a ternary constraint and a sparsity constraint. The ternary constraint mandates that, for each layer (or each node, in other embodiments), all of the weight values are either zero, a positive value, or a negative of the positive value. The sparsity constraint mandates that a certain percentage (e.g., 75%) of the weight values are equal to zero. In some embodiments, the sparsity constraint is stronger, mandating that the particular percentage of the weight values are zero for each filter, or even for each filter slice that is performed by a particular partial dot product computation circuit.

The process 500 assigns (at 510) the weight values to partial dot product computation circuits. That is, the compiler determines which partial dot product computation circuit in the IC will perform each partial dot product required to execute the network. The compiler may factor in the overall network to keep groups of partial dot product computations within a single core or group of cores of the IC, or other considerations.

Next, the process 500 performs the mapping of input values to multiplexers for each partial dot product computation. Though shown as selecting one partial dot product computation at a time, it should be understood that this is a conceptual process, and different embodiments may perform these operations for numerous dot product computations in parallel.

As shown, the process selects (at 515) a partial dot product computation, and maps (at 520) the input values with nonzero weight values to different multiplexer inputs. In the case of the partial dot product computation circuits 400 shown in FIG. 4, the process determines, for each of the input values 405, via which of the two wire sets to provide the input value at runtime. In some embodiments, the compiler uses the same cuckoo hashing algorithm for this mapping as was used to determine the wiring. Specifically, the compiler of some embodiments assigns each input value to one of its wire sets (and thus to a multiplexer) in order. For input values with a corresponding weight of zero, to which wire set the value is assigned does not matter. However, if a first input value with a nonzero corresponding weight is mapped to a multiplexer that already has a second input value with a nonzero corresponding weight mapped to it, then the second input value is assigned to its second wire set. If this new mapping overlaps multiplexers with a third input value with a nonzero corresponding weight, then the third input value is assigned to its other wire set, and so on.

In some embodiments, this may require reordering the input values or splitting the partial dot product into multiple filter slices, if a solution is not available that provides each of the input values with a corresponding nonzero weight value to a different multiplexer. The wiring of the input values to multiplexers does not guarantee a solution for any arrangement of weight values (e.g., if exactly 36 of the 144 weight values are equal to 0, not all arrangements will have a solution), but so long as there are at most 25% nonzero weight values then there is always an arrangement of the weight values that enables all of the input values with nonzero corresponding weights to map to different multiplexers.

Next, the process 500 determines (at 525) whether additional partial dot product computations require mapping. For a typical network, there are thousands, if not millions, of such partial dot product computations to map (each node may require numerous partial dot product computations, and a single network may have thousands or millions of nodes). If additional mapping is required, the process returns to 515 to select the next partial dot product computation to map.

Once the input values for all of the partial dot product computations have been mapped, the process 500 configures (at 530) the integrated circuit to implement the network. That is, the weight values and other parameters are loaded into the IC memories, and the controllers are configured to execute the operations as required by the network definition.

Returning to FIG. 4, the select bits for the multiplexers 410 are determined by which of the inputs to the multiplexer carries an input activation value with a nonzero corresponding weight value. These multiplexers 410 provide their output to a set of ternary multiply-accumulator (MAC) circuits 415. The ternary MAC circuits effectively form the leaves of the dot product computation, and the number of such circuits is half the number of multiplexers 410 (18 ternary MAC circuits 415 in this example).

As described, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 415 adds the two input values from the multiplexers 410 while also receiving as inputs the corresponding weight values for these input values. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value). More detail regarding these ternary MACs is provided below by reference to FIGS. 8 and 9.

The outputs of the ternary MACs provide the inputs to the adder tree 420 that computes the output for the partial dot product computation. In some embodiments, this adder tree is a standard adder tree circuit that adds pairs of values over several layers. For example, the adder tree 420 receives 18 inputs for 9 adders, which in turn provide outputs to 4 adders (with an additional output to be added in later), etc. In some embodiments, the inputs to the ternary MACs 415 are 4-bit inputs (the length of the quantized activation values), and the ternary MACs 415 output 6-bit values. The adder tree 420 receives these 6-bit values and outputs a 10-bit value after several stages of addition.

Figure 6:
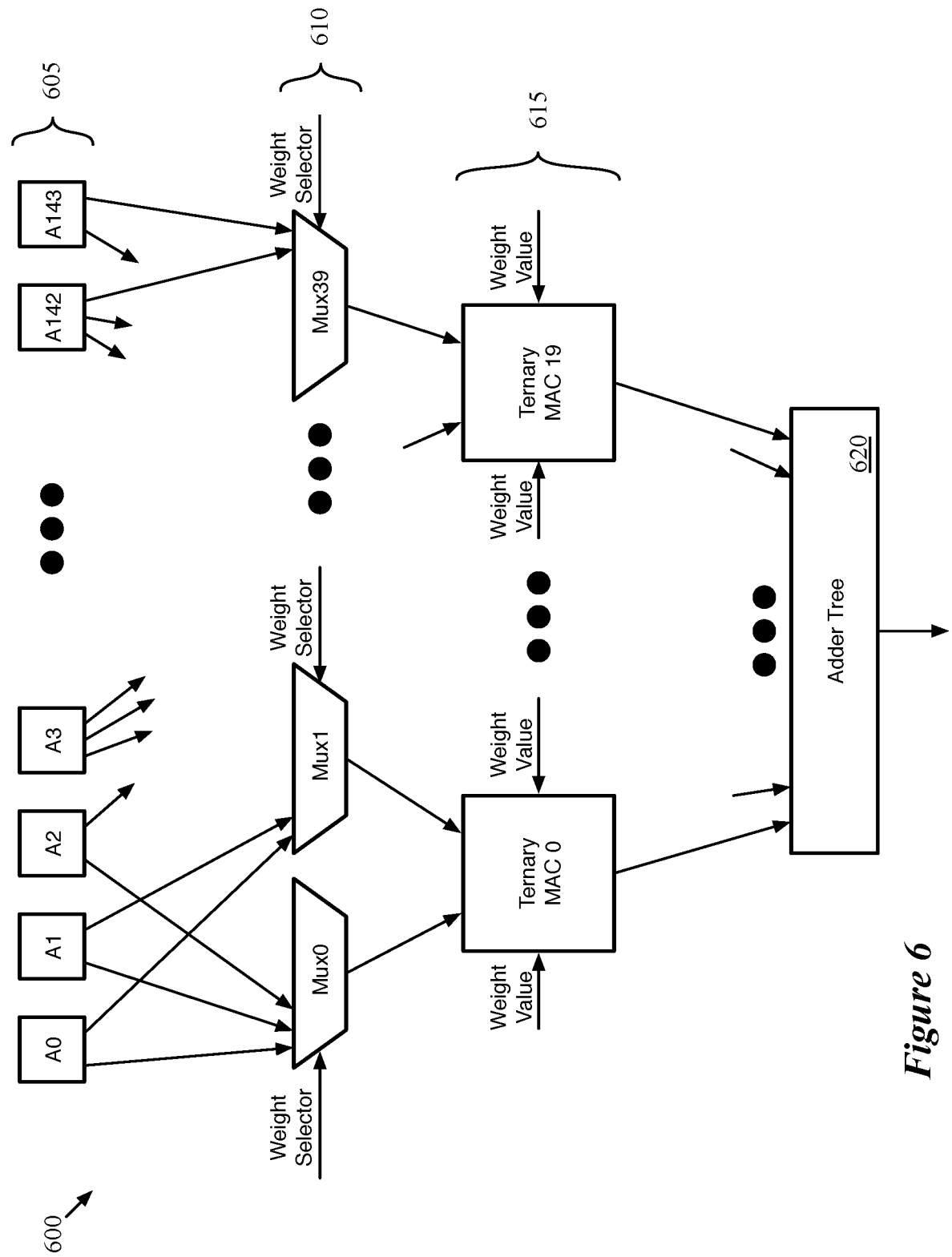
FIG. 6 illustrates a partial dot product computation circuit with redundant multiplexer inputs.

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. FIG. 6 illustrates a partial dot product computation circuit 600 with redundant multiplexer inputs. The partial dot product computation circuit 600 is structured in the same manner as the circuit 400, and includes 144 activation inputs 605, a set of forty multiplexers 610, a set of twenty ternary MAC circuits 615, and an adder tree 620.

The difference between the circuit 400 of FIG. 4 and the circuit 600 is that the latter includes additional multiplexers 610 (in this case, four) and thus additional ternary MACs 615 (in this case, two). In addition, in some such embodiments, a subset of the input values are wired to three of the dot product inputs rather than two. In this example, the four additional multiplexers allow for thirty-two of the activation inputs to be wired to three of the multiplexers rather than just two. For instance, the fourth activation input value 605 (A3) includes three wire sets connecting to three different multiplexers 610, as does the 143$^{rd}$ activation input value (A142). These additional wires provide the compiler with more options for mapping the input values with nonzero corresponding weights to the multiplexers, and thus make this mapping process (e.g., the operation 520 from FIG. 5) easier at a small cost in terms of overall circuit area.

Figure 7:
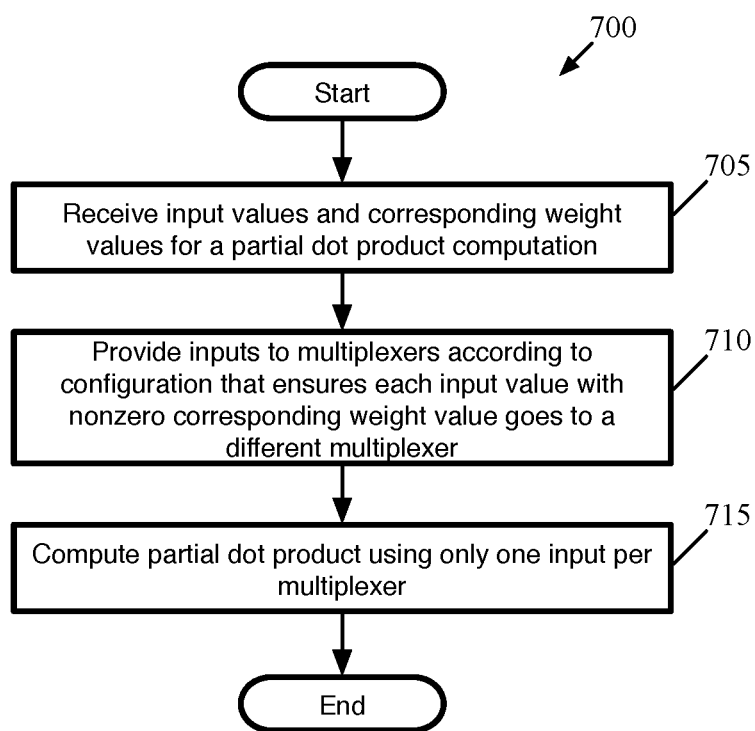
FIG. 7 conceptually illustrates a process of some embodiments for calculating a partial dot product.

FIG. 7 conceptually illustrates a process 700 of some embodiments for calculating a partial dot product. In some embodiments, the process 700 is performed by a partial dot product computation circuit such as that shown in FIG. 4 or 6. An IC executing a neural network may perform this process many thousands (or millions) of times per execution of the network at runtime.

As shown, the process 700 begins by receiving (at 705) a set of input values and corresponding weight values. By reference to FIG. 3, these may be the weight values loaded into a particular filter slice buffer and the activation input values loaded into the activation window buffer. In some embodiments, the respective controllers for these buffers arrange the input values and the weight values as configured by the compiler.

Next, the process 700 provides (at 710) the input values to the multiplexers according to a configuration that ensures that each input value with a nonzero corresponding weight value is provided to a different multiplexer that selects that value. In some embodiments, each of the buffer locations provides its input value to one of the multiplexers via one of its sets of wires. In other embodiments, each buffer location provides the input values via all of its sets of wires, and thus at least two different multiplexers receive the input values. In either case, the multiplexers also receive select bits as per the configuration, ensuring that each input value with a nonzero weight value is output by exactly one multiplexer.

Lastly, the process 700 computes (at 715) the partial dot product using only one input per multiplexer. If there are fewer input values with nonzero weight values than multiplexers in the partial dot product computation circuit, then some of these multiplexers will output an input value with a weight value of zero. The partial dot product computation circuit accounts for these weight values in the ternary MAC circuits, then uses a standard adder tree to complete the computation in some embodiments.

In some embodiments, the ternary MAC (or other circuit used to incorporate the ternary weight values into the dot product) uses the two's complement technique to negate input values with a negative corresponding weight value. This technique inverts all of the bits of the input value and adds 1 to this inverted value. However, the use of this technique requires a half adder circuit for each ternary MAC, in order to add 1 to the inverted value.

Figure 8:
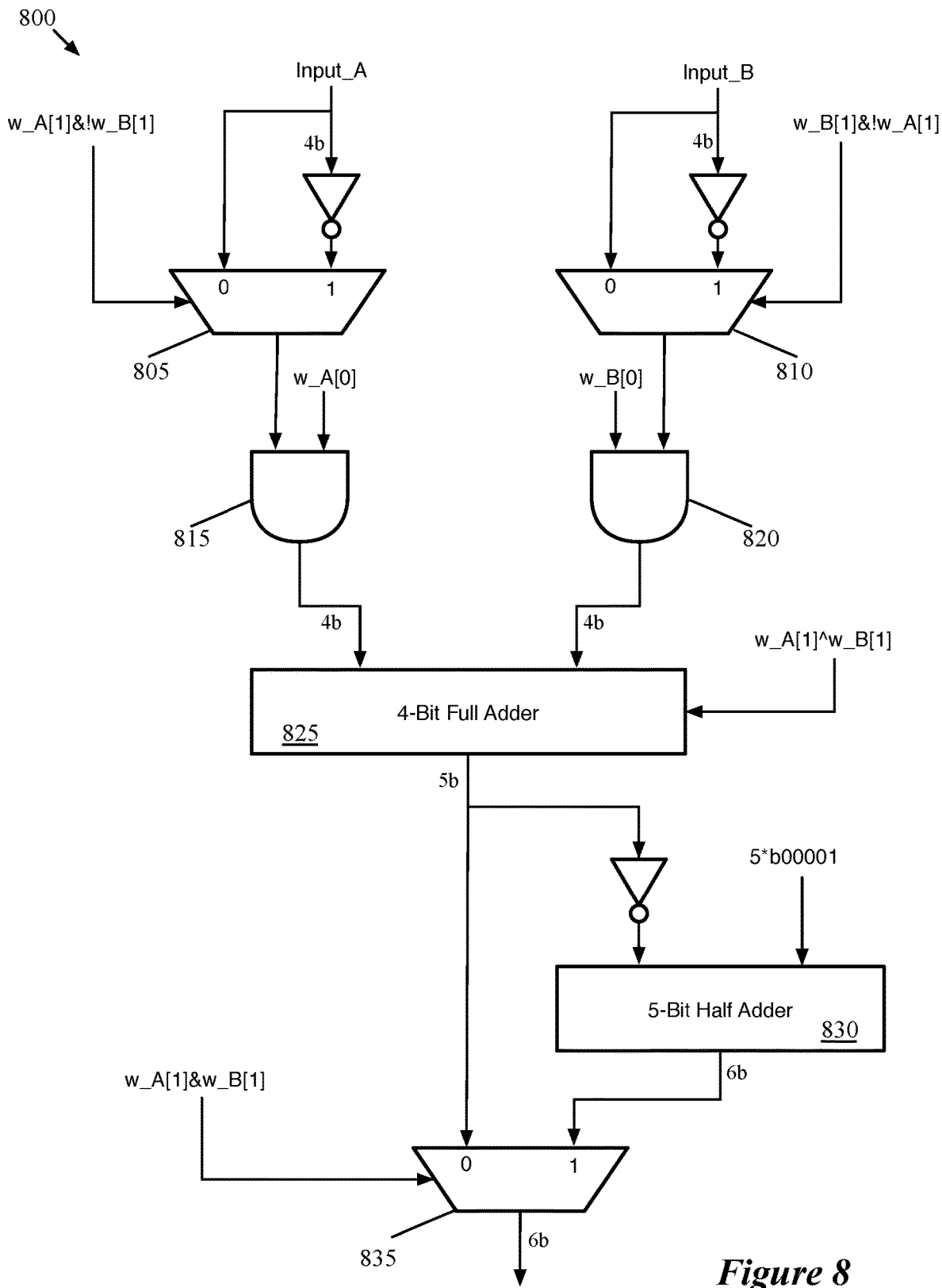
FIG. 8 illustrates a ternary MAC circuit of some embodiments.

FIG. 8 illustrates such a ternary MAC circuit 800. As shown, the ternary MAC 800 includes a pair of 2-input multiplexers 805 and 810, a pair of and gates 815 and 820, a full adder 825, a half adder 830, and a final 2-input multiplexer 835. This example circuit 800 receives two 4-bit activation inputs A and B and outputs a 6-bit value, though other embodiments with different activation inputs use similar circuits (e.g., with adders for different bit lengths).

The first multiplexer 805 receives as its two inputs the first activation input A as well as the binary inversion of this value (e.g., if A=0110, then the inversion of this is 1001). With signed integers, inverting a binary number then adding 1 to that inverted value gives the negative of the binary number, so in this case the multiplexer receives A and (−A−1).

In the notation used in this and the subsequent figure, a weight value of 0 for A means that the bits w_A[1]=0 and w_A[0]=0. A weight value of 1 for A means that the bits w_A[1]=0 and w_A[0]=1, and a weight value of −1 for A means that the bits w_A=1 and w_B=−1. Similar bits w_B[1] and w_B[0] are determined based on the weight value for B. As such, the select bit for the multiplexer 805 is true (equal to 1) if the corresponding weight value for A is negative and the corresponding weight value for B is negative (equal to 0). Thus, the multiplexer 805 passes the inversion of the value A if A has a negative corresponding weight and B does not have a negative corresponding weight, and otherwise passes the value A. The other multiplexer 810 (for input_B) has a similar select bit, such that the multiplexer 810 passes the inversion of the value B if B has a negative corresponding weight and A does not have a negative corresponding weight, and otherwise passes the value B.

These inputs are then gated using and gates 815 and 820 so that the value 0 is passed for either input if that input has a corresponding weight value of 0. That is, the bit w_A[0] is true and thus the and gate 815 passes the input A (or the inversion of A) if the weight value for A is not zero. Similarly, the bit w_B[0] is true and thus the and gate 820 passes the input B (or the inversion of B) if the weight value for B is not zero. Gating the inputs early reduces the power consumption in some embodiments (in case, e.g., both inputs to the adder 825 are 0).

The full adder 825 adds the two 4-bit values received from the and gates 815 and 820, and outputs a 5-bit value. Here the carry bit is a value that is equal to 1 if either of the weight values for the two inputs is equal to −1, but not if both of the weight values are equal to −1. The full adder 825 is a standard adder, and this carry bit adds in the 1 to account for one of the input values being inverted. As noted above, if both weight values are −1, then the values are not inverted at this point, and thus the adder 825 adds the positive inputs, and no carry bit is needed.

The output of the full adder 825 is (i) provided to one of the inputs of a 2-input multiplexer 835 and (ii) inverted and provided to a half adder 830, which provides its output to the second input of the multiplexer 835. This half adder 835 adds the value 1 to the inverted output and is selected by the multiplexer 835 only if both of the weight values are −1. That is, if only one of the weight values are negative, then the full adder 825 adds the binary inversion of the input with the negative corresponding weight to the input with the positive corresponding weight (or to zero) and the carry bit accounts for addition of 1 with the two's complement technique. On the other hand, if both of the weight values are negative, then the inputs are added as though the weights are positive, then this output is inverted and the half adder 830 adds one to complete the two's complement technique.

This ternary MAC circuit 800 fully accounts for the weight values (except for any multiplication if the positive weight value is actually a value other than 1. The values passed to the adder tree simply need to be added together. However, in order to save additional circuit space, some embodiments determine (at compile time) the number of negative weight values for each dot product computation and add this number to the dot product at the end of the computation. This enables the dot product computation circuits to use ternary MAC circuits without the half adder 830 and the multiplexer 835, which is a substantial cost savings in terms of circuit surface area.

Figure 9:
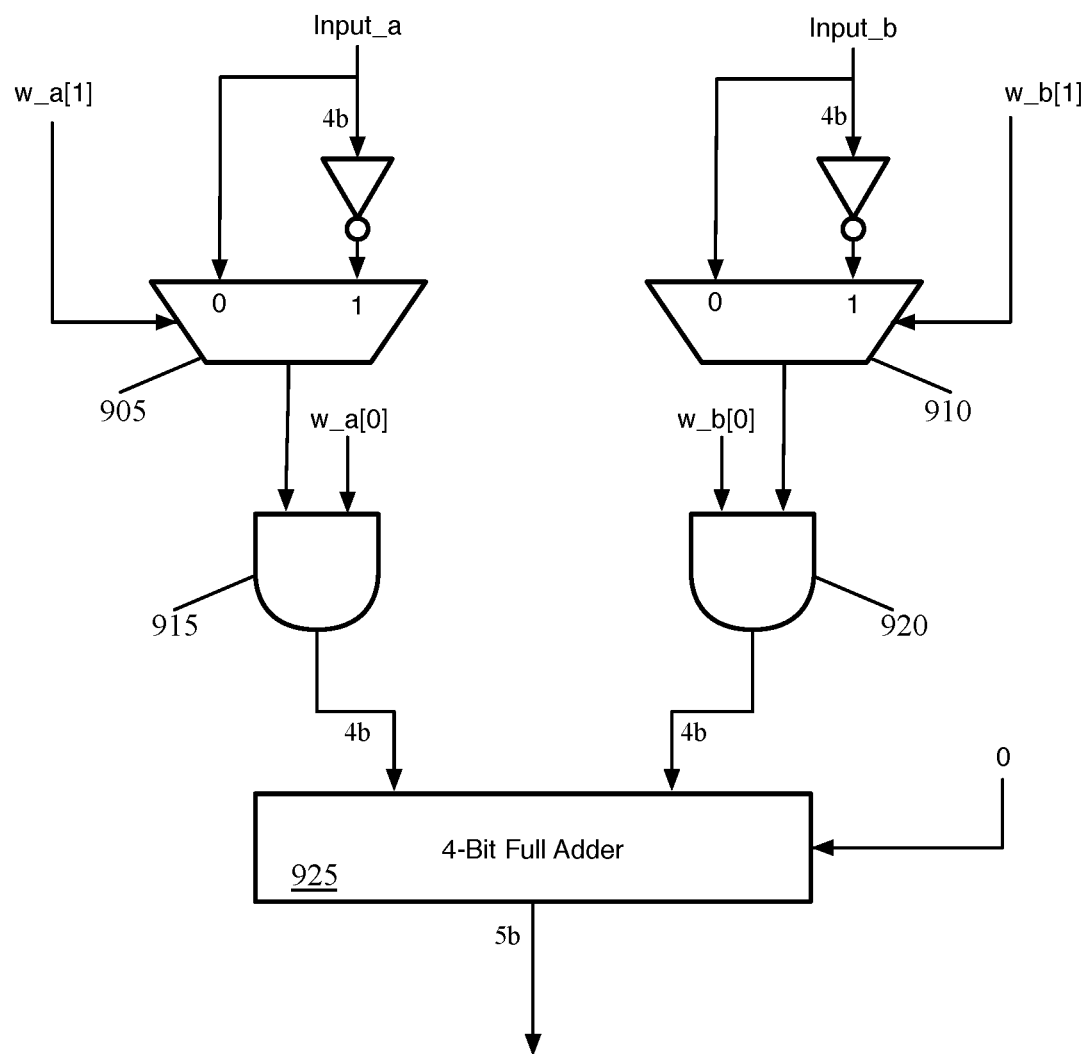
FIG. 9 illustrates a reduced-area ternary MAC circuit of some embodiments.

FIG. 9 illustrates such a reduced-area ternary MAC circuit 900 of some embodiments. For each input value, this ternary MAC circuit 900 provides to the dot product computation (i) the value zero if the corresponding weight value is zero, (ii) the input value if the corresponding weight value is positive, and (iii) the binary inversion of the input value if the corresponding weight value is negative (without adding 1 to the binary inversion).

As shown, the ternary MAC circuit 900 includes a pair of 2-input two multiplexers 905 and 910, a pair of and gates 915 and 920, and a full adder 925. Compared to the circuit 800, this circuit 900 removes an inverter, a half adder, and a multiplexer. As an example, an IC with 18 ternary MAC circuits for each of 64 partial dot product computation circuits on each of 16 cores would have over 18,000 such ternary MAC circuits, so the area savings by removing these adders and multiplexers is substantial.

The first multiplexer 905 receives as its two inputs the first activation input A as well as the binary inversion of this value. In this case, the select bit for the multiplexer is simply w_A[1], which is only true if the corresponding weight value for A is negative. As such, if activation input A has a negative weight value, then the multiplexer 905 selects the binary inversion of the input value, and if activation input A has a positive weight value (or a weight value of zero), then the multiplexer 905 selects the input value. The multiplexer 910 provides a corresponding selection of either the activation input value B or the binary inversion of this value B based on the corresponding weight value for input B.

As with the ternary MAC circuit 800, the outputs of the multiplexers 905 and 910 are provided to and gates 915 and 920 where the inputs are gated with the w_A[0] and w_B[0] bits, respectively, so that the value 0 is passed for activation inputs with a corresponding weight of 0. These inputs (either the input value, the binary inversion of the input value, or the value 0) are provided to the full adder 825, which adds the two values (with a carry bit of 0) and outputs a 5-bit value (assuming 4-bit inputs) to the full adder tree.

Figure 10:
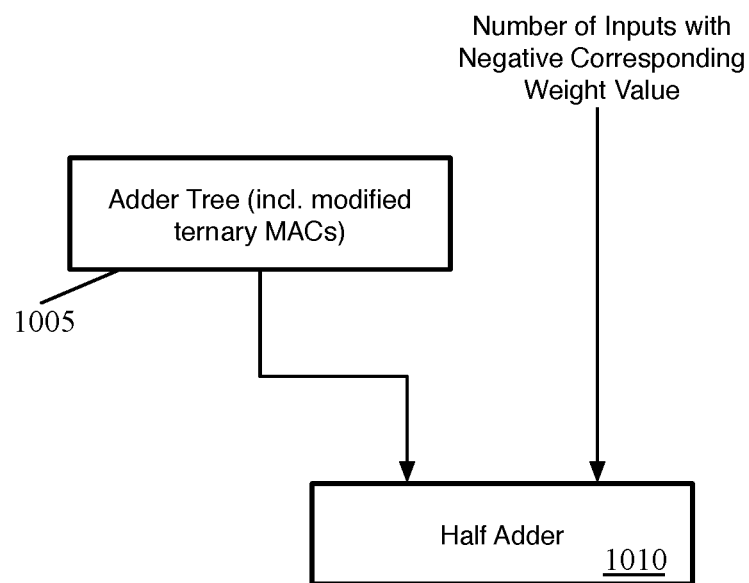
FIG. 10 illustrates an adder tree that uses the modified ternary MACs such as those shown in FIG. 9.

This ternary MAC circuit 900 is simpler than that shown in FIG. 8, but does not account for the need to add 1 to each binary inversion in order to accurately negate those input values. Thus, as shown in FIG. 10, some embodiments use one additional half adder to add in these additional bits to the dot product. This additional half adder may be incorporated into the IC per adder tree (i.e., per partial dot product computation) or per overall dot product computation (e.g., into the activation post-processing).

FIG. 10 illustrates an adder tree 1005 that uses the modified ternary MACs such as those shown in FIG. 9. This adder tree provides an output to an additional half adder 1010, which receives as its other input a value equal to the number of inputs used by the adder tree 1005 that have a negative corresponding weight value. The half adder 1010 incorporates this additional value into the dot product and thus completes the two's complement addition of the inputs with negative corresponding weight values. In some embodiments, the network includes a bias factor for each dot product that is added into the dot product, and in this case the number of negative weights can be added in along with this bias, in which case no additional circuitry is required to incorporate this value.

Figure 11:
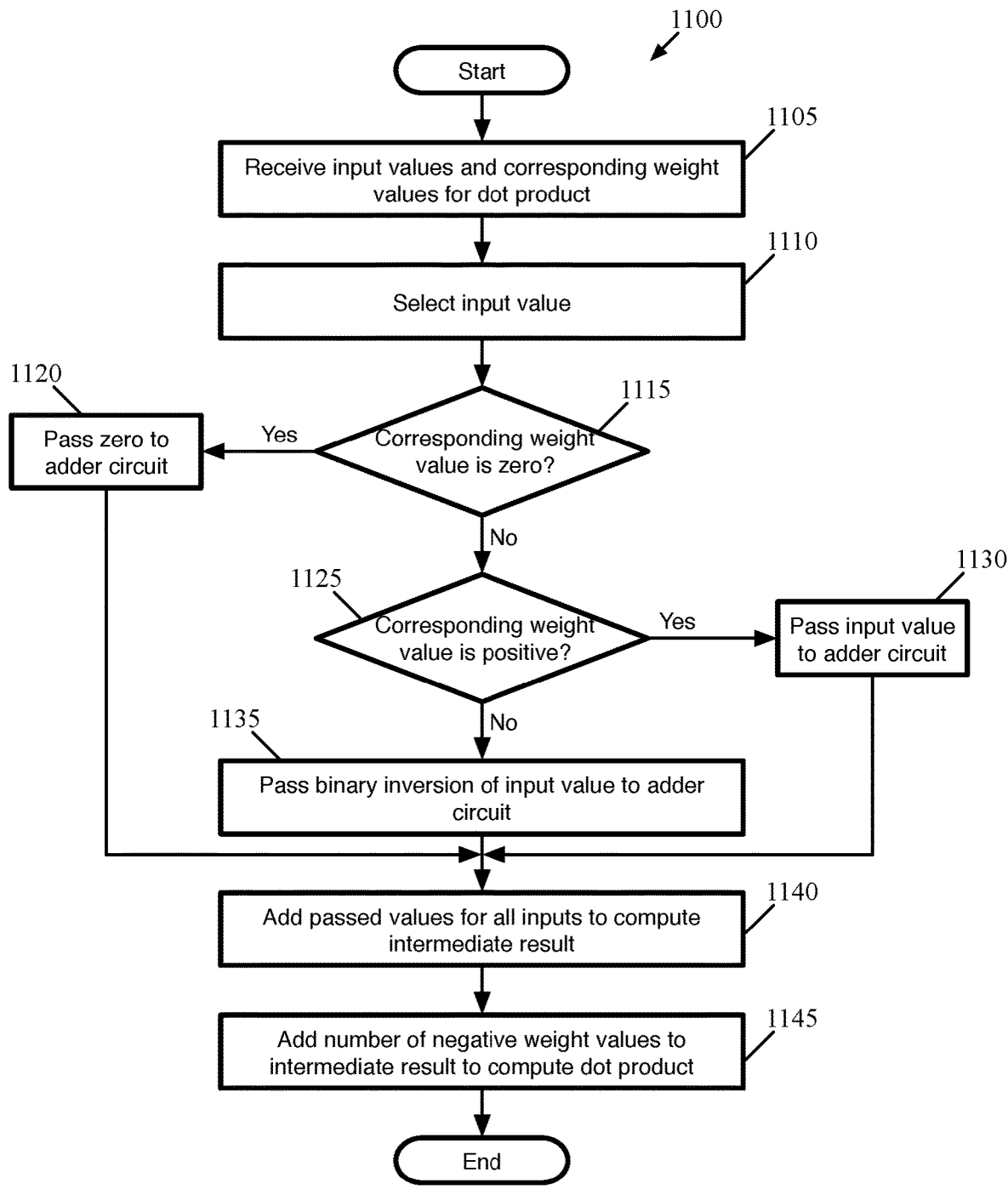
FIG. 11 conceptually illustrates a process of some embodiments for computing a dot product.

FIG. 11 conceptually illustrates a process 1100 of some embodiments for computing a dot product (or a partial dot product). This process 1100 is performed by an IC of some embodiments (e.g., by a partial dot product computation circuit, by a set of such circuits that compute a complete dot product, etc.) that uses ternary MACs such as that shown in FIG. 9, which pass, for each input value, (i) the value zero if the corresponding weight value is zero, (ii) the input value if the corresponding weight value is positive, and (iii) the binary inversion of the input value if the corresponding weight value is negative.

As shown, the process 1100 begins by receiving (at 1105) a set of input values and corresponding weight values for the dot product. By reference to FIG. 3, these may be the weight values loaded into a particular filter slice buffer and the activation input values loaded into the activation window buffer, or numerous instances of these weight values and activation input values required for a complete dot product for a node of a neural network.

The process 1100 then determines what value to pass to the dot product computation for each input value. As shown, the process selects (at 1110) an input value. It should be understood that the process 1100 is a conceptual illustration of the process performed by the IC. While shown as an iterative process that selects each input value in process, the actual operation of some embodiments performs these operations in parallel (e.g., in the same clock cycle) across numerous ternary MACs (which each handle two inputs). In addition, the ternary MACs do not make decision operations per se, but instead operate as described by reference to FIG. 9.

For the selected input value, the process 1100 determines (at 1115) whether the corresponding weight value is zero. If this is the case, the process passes (at 1120) the value zero to the adder circuit. In the ternary MAC circuit 900, this operation is implemented by the and gates 915 and 920. If the weight value is not zero, the process determines (at 1125) whether the corresponding weight value is positive. If the weight value is positive, the process passes (at 1130) the input value to the adder circuit. On the other hand, if the weight value is not positive (and therefore is negative), the process passes (at 1135) the binary inversion of the input value to the adder circuit. These operations are implemented by the multiplexers 905 and 910 (along with the inverters) in the ternary MAC circuit 900.

Next, the process 1100 adds (at 1140) the values passed for each input to compute an intermediate result for the dot product. In the IC of some embodiments, the full adders 925 as well as the adder trees for each partial dot product computation (and, in some embodiments, the additional adders that combine the partial dot products) perform this addition.

Finally, the process 1100 adds (at 1145) the number of negative weight values to this intermediate result to complete the computation of the dot product. As described above, the compiler determines the number of negative weight values used for each portion of the dot product and is able to factor this value into the appropriate adder, which may be incorporated at the end of each partial dot product computation, or at the end of each complete dot product computation (e.g., along with the bias constant).

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 12:
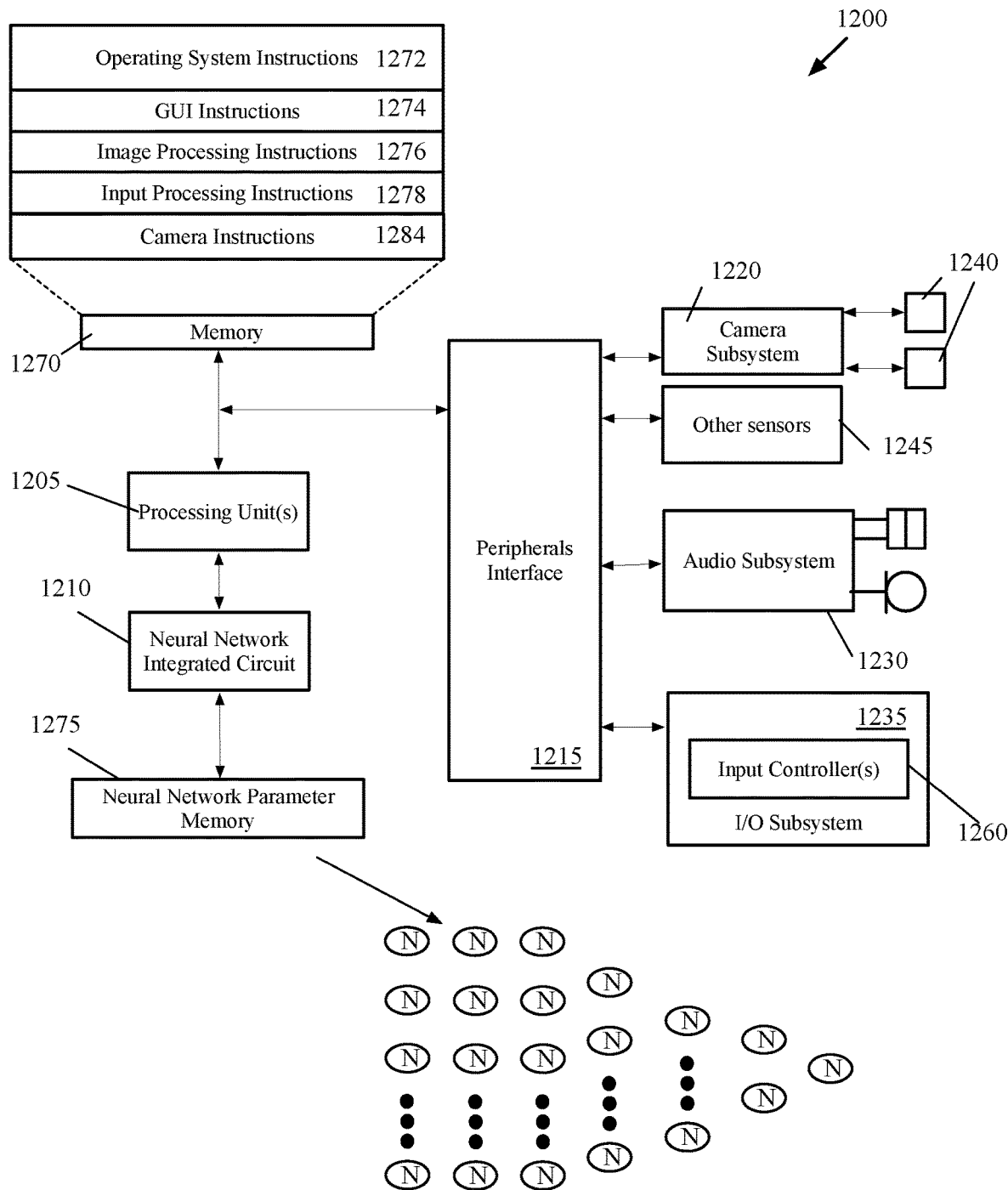
FIG. 12 is an example of an architecture of an electronic device that includes the neural network integrated circuit of some embodiments.

FIG. 12 is an example of an architecture 1200 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1200 includes one or more general-purpose processing units 1205, a neural network integrated circuit 1210, and a peripherals interface 1215.

The peripherals interface 1215 is coupled to various sensors and subsystems, including a camera subsystem 1220, an audio subsystem 1230, an I/O subsystem 1235, and other sensors 1245 (e.g., motion/acceleration sensors), etc. The peripherals interface 1215 enables communication between the processing units 1205 and various peripherals. For example, an orientation sensor (e.g., a gyroscope) and an acceleration sensor (e.g., an accelerometer) can be coupled to the peripherals interface 1215 to facilitate orientation and acceleration functions. The camera subsystem 1220 is coupled to one or more optical sensors 1240 (e.g., charged coupled device (CCD) optical sensors, complementary metal-oxide-semiconductor (CMOS) optical sensors, etc.). The camera subsystem 1220 and the optical sensors 1240 facilitate camera functions, such as image and/or video data capturing.

The audio subsystem 1230 couples with a speaker to output audio (e.g., to output voice navigation instructions). Additionally, the audio subsystem 1230 is coupled to a microphone to facilitate voice-enabled functions, such as voice recognition, digital recording, etc. The I/O subsystem 1235 involves the transfer between input/output peripheral devices, such as a display, a touch screen, etc., and the data bus of the processing units 1205 through the peripherals interface 1215. The I/O subsystem 1235 various input controllers 1260 to facilitate the transfer between input/output peripheral devices and the data bus of the processing units 1205. These input controllers 1260 couple to various input/control devices, such as one or more buttons, a touchscreen, etc.

In some embodiments, the device includes a wireless communication subsystem (not shown in FIG. 12) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 12, a memory 1270 (or set of various physical storages) stores an operating system (OS) 1272. The OS 1272 includes instructions for handling basic system services and for performing hardware dependent tasks. The memory 1270 also stores various sets of instructions, including (1) graphical user interface instructions 1274 to facilitate graphic user interface processing; (2) image processing instructions 1276 to facilitate image-related processing and functions; (3) input processing instructions 1278 to facilitate input-related (e.g., touch input) processes and functions; and (4) camera instructions 1284 to facilitate camera-related processes and functions. The processing units 1210 execute the instructions stored in the memory 1270 in some embodiments.

The memory 1270 may represent multiple different storages available on the device 1200. In some embodiments, the memory 1270 includes volatile memory (e.g., high-speed random access memory), non-volatile memory (e.g., flash memory), a combination of volatile and non-volatile memory, and/or any other type of memory.

The instructions described above are merely exemplary and the memory 1270 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1275 stores the weight values, bias parameters, etc. for implementing one or more machine-trained networks by the neural network IC 1210. As mentioned above, different clusters of cores of the IC 1275 can implement different machine-trained networks in parallel in some embodiments. In different embodiments, these neural network parameters are stored on-chip (i.e., in memory that is part of the neural network IC 1210) or loaded onto the IC 1210 from the neural network parameter memory 1275.

While the components illustrated in FIG. 12 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1205 and the neural network IC 1210, which enables the processing units 1205 to provide inputs to the neural network IC 1210 and receive the outputs of the network from the IC 1210. Also, while many of the functions have been described as being performed by one component, one of ordinary skill in the art will realize that the functions described with respect to FIG. 12 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
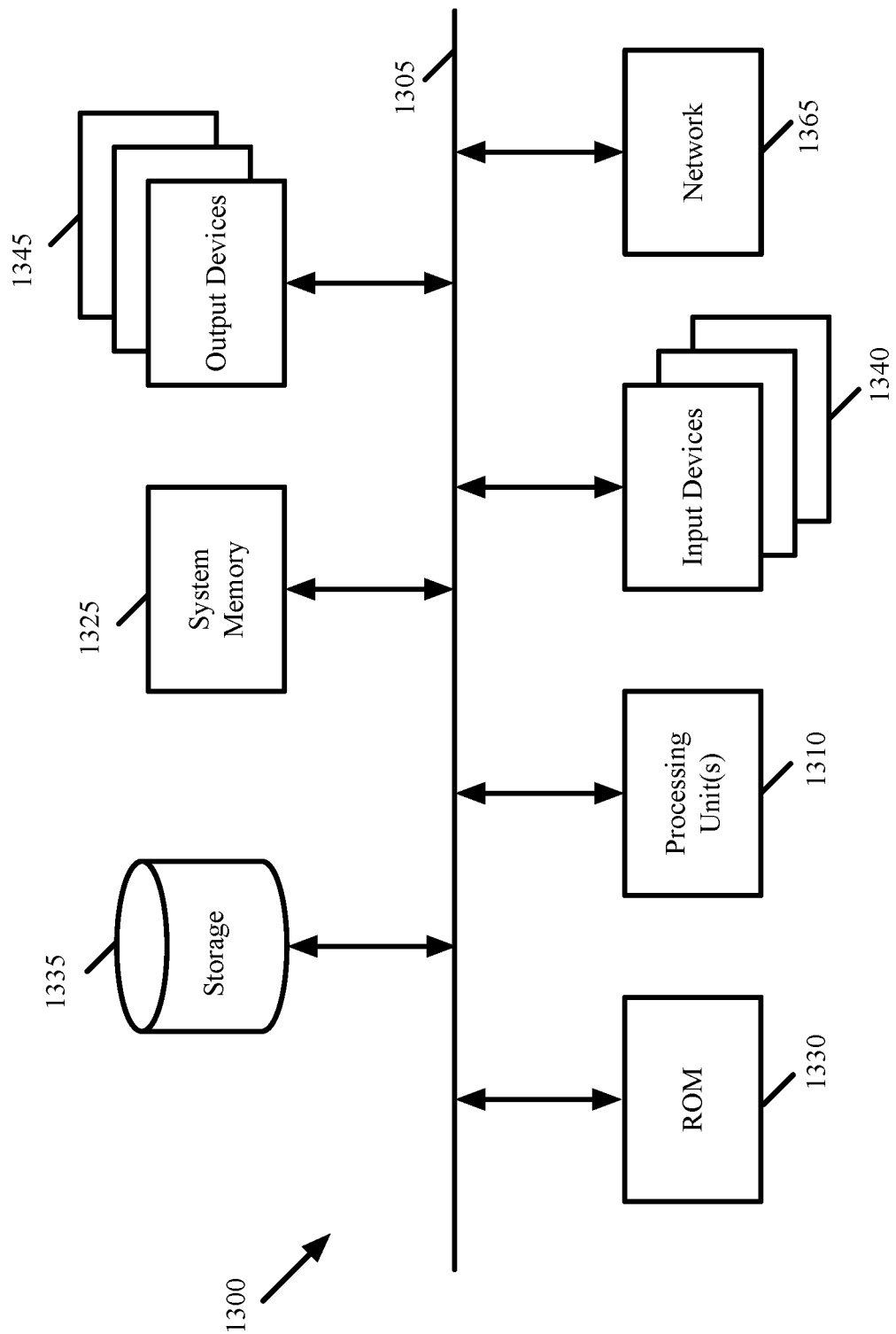
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control and/or compiler systems described above in some embodiments. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 5, 7, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for executing at least a portion of a particular node of a machine-trained network on a machine-trained network circuit, the method comprising:
 receiving (i) a plurality of node input values computed by previous nodes of the machine-trained network and (ii) for each of the node input values, a corresponding predefined weight value, wherein each of the weight values is one of zero, a positive value, and a negation of the positive value;
 to compute a dot product of the node input values with the corresponding weight values:
  for each input value with a corresponding positive weight value, passing the input value to an adder circuit of the machine-trained network circuit;
  for each input value with a corresponding weight value of zero, passing the value zero to the adder circuit;
  for each input value with a corresponding negative weight value, passing a binary inversion of the input value to the adder circuit, wherein the binary inversion flips each bit of the input value;
  adding the values passed to the adder circuit to compute an intermediate dot product value; and
  adding an additional value based on a number of negative weight values to the intermediate dot product value to compute the dot product of the node input values with the corresponding weight values.

2. The method of claim 1, wherein the positive value is one and the negation of the positive value is negative one.

3. The method of claim 1, wherein the positive value is a value other than one, wherein the method further comprises multiplying a result of adding the additional value to the intermediate dot product by the value other than one to compute the dot product of the node input values with the corresponding weight values.

4. The method of claim 1, wherein a compiler for the machine-trained network circuit stores the predefined weight values and determines the number of negative weight values prior to the receipt of the node input values.

5. The method of claim 1, wherein the adder circuit comprises an adder tree for adding the values passed to the adder circuit.

6. The method of claim 5, wherein adding the additional value to the intermediate dot product value after the adder tree saves circuit area compared to adding one to each binary inversion of the input value at leaves of the adder tree.

7. The method of claim 1, wherein the additional value is the number of negative weight values.

8. The method of claim 1, wherein the additional value is a bias plus the number of negative weight values.

9. The method of claim 1, wherein the machine-trained network circuit comprises a plurality of adder circuits that each execute portions of the particular node by computing respective intermediate dot products.

10. The method of claim 9 further comprising adding the intermediate dot products from each of the adder circuits prior to adding the additional value.

11. An integrated circuit (IC) for implementing a machine-trained network, the IC comprising:
 a set of circuits for computing a dot product of (i) a set of input values and (ii) a set of predefined weight values comprising a weight value corresponding to each of the input values, wherein each of the weight values is one of zero, a positive value, and a negation of the positive value, wherein the set of circuits comprises:
  a plurality of input circuits that receive the input values and provide to an adder circuit (i) the input value, for each input value with a corresponding positive weight value, (ii) the value zero, for each input value with a corresponding weight value of zero, and (iii) a binary inversion of the input value, for each input value with a corresponding negative weight value, wherein the binary inversion flips each bit of the input value;
  the adder circuit that adds the values received from the plurality of input circuits to compute an intermediate value; and
  a post-processing circuit that adds to the intermediate value from the adder circuit an additional value based on a number of negative weight values to compute the dot product of the set of input values with the set of corresponding weight values.

12. The IC of claim 11, wherein the positive value is one and the negation of the positive value is negative one.

13. The IC of claim 11, wherein the positive value is a value other than one, wherein the post-processing circuit further multiplies a result of adding the additional value to the output of the adder circuit by the value other than one.

14. The IC of claim 11, wherein a compiler for the IC uses the predefined weight values to determine the number of negative weight values prior to the set of circuits receiving the node input values.

15. The IC of claim 11, wherein the adder circuit comprises an adder tree for adding the values received by the adder circuit from the plurality of input circuits.

16. The IC of claim 15, wherein adding the additional value to the intermediate value from the adder circuit saves circuit area compared to adding one to each binary inversion of the input value at leaves of the adder tree.

17. The IC of claim 11, wherein the additional value is the number of negative weight values.

18. The IC of claim 11, wherein the additional value is a bias plus the number of negative weight values.

19. The IC of claim 11, wherein the IC comprises a plurality of sets of circuits that each compute dot products.

* * * * *